Sept. 27, 1960  P. GÜTTINGER ET AL  2,954,555

RADIO GUIDING SYSTEM

Filed Aug. 29, 1952  3 Sheets-Sheet 1

INVENTORS:
P. Guttinger, G. Guanella, G. Weber and M. Gallo
BY Richards Geier
ATTORNEYS

United States Patent Office 2,954,555
Patented Sept. 27, 1960

2,954,555
RADIO GUIDING SYSTEM

Paul Güttinger, Wettingen, Aargau, Gustav Guanella, Zurich, Georg Weber, Kusnacht, Zurich, and Mario Gallo, Zurich, Switzerland, assignors to Contraves A.G., Zurich, and Patelhold Patentverwertungs- & Elektro-Holding A.G., Glarus, Switzerland Filed Aug. 29, 1952, Ser. No. 307,098

Claims priority, application Switzerland Aug. 30, 1951

4 Claims. (Cl. 343—106)

The present invention relates to a radio guiding system and refers more particularly to a radio guiding system for the remote guidance of flying objects.

In the remote guidance of flying objects by ultra high frequency electrical energy with a claviform radiation pattern which, with the prescribed path of the projectile, encloses a predetermined angle and rotates about that path, a method is known in which the guidance takes place inter alia as a function of an angle of two planes intersecting the prescribed path of the object, one of which planes passes through the flying object and is able to rotate about the prescribed path whilst the other constitutes a data or reference plane not rotatable in respect of the prescribed path. In order to fix the location of this reference plane in the known method a signal is, at a determined point in the rotation of the radiation pattern about the prescribed path, transmitted to the flying object, which signal generates in a receiver on the flying object an auxiliary oscillation the frequency of which coincides with the frequency of a second oscillation arising in the said receiver through the rotation of the radiation pattern; by determining the phase of this second oscillation in respect of the auxiliary oscillation a dimension for the said angle is obtained.

This method of generating a control quantity for the flying object has various substantial drawbacks. In the first place, any interference with the transmission of the signal to the flying object affects the latter in a particularly pronounced degree because in the event of the absence of this signal in the receiver of the flying object the latter remains uninfluenced by the control quantity until the arrival of a further signal, i.e., at least during one entire rotation of the radiation pattern. Furthermore, the generation of the auxiliary oscillation in the receiver of the flying object necessitates the provision of an oscillator. In addition, circuit elements must be provided in the flying object which is undesirable. Again, in this method the ultra high frequency energy received is converted directly into a low-frequency oscillation and amplified to the necessary amplitude in a regulated low-frequency amplifier. It is a well-known fact, however, that it is very difficult to build a low-frequency amplifier with a sufficiently small time constant.

It is therefore an object of the present invention to provide means for the remote guidance of a flying object in an efficient and relatively simple manner.

A further object of the present invention is the provision of means providing a safe and reliable guiding of a flying object by radio control.

Another object of the present invention is to provide a system of radio control for guiding a flying object from a guide station by means of pulsed ultra high frequency emission of electrical energy in a clavate directional radiation pattern, the radiation pattern being continuously rotated about an axis defining a flight path for the flying object.

A further object of the present invention is the provision of a transmitting and receiving system for a guide station and a guiding flying object, respectively, wherein, due to the rotation of an emission pattern about an axis defining a predetermined path for the flying object, deviations of said flying object from said path or said axis will be indicated in the receiving system in the form of amplitude variations and phase displacements of a signal received therein, the phase displacements being compared with a continuously received phase reference signal, thus providing for a determination of the position of the flying object with respect to said predetermined path.

A further object of the present invention is the provision of a transmitter in a radio control guide station for a flying object, which emits the ultra high frequency radiation energy in the form of pulses, following each other in a predetermined sequence, the variation of the time interval between immediately following pulses of a sequence providing for a phase reference signal, with respect to which a varying signal received by the flying object when deviating from a predetermined path may be compared.

A further object of the present invention is the provision of a receiver in a flying object guided by ultra high frequency energy pulses, wherein demodulation elements in the receiver may operate with substantial linear characteristics over the full range of field strength of the pulses received by said flying object, thus leading to a simplified yet accurate guidance.

Still another object of the present invention is to provide for a transmitter in a radio guidance system for flying objects, which transmitter radiates ultra high frequency pulses of constant amplitude in an uninterrupted sequence to thereby ensure continuous guiding of said flying object.

These and other objects of the present invention will become further apparent from the following detailed description, reference being made to the accompanying drawing showing, by way of example, a preferred embodiment of the invention.

Figure 1:
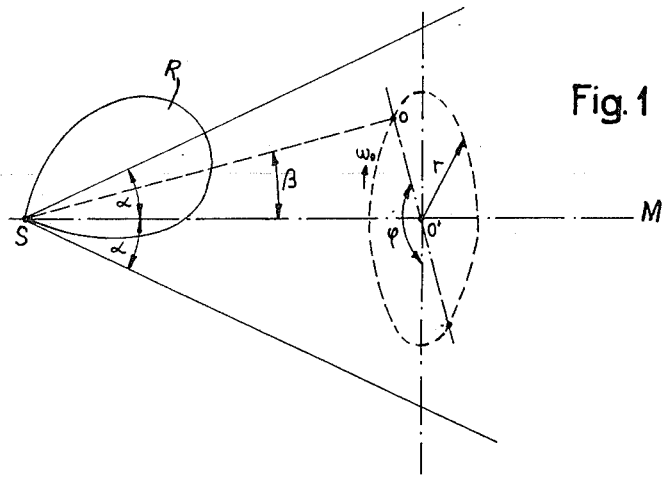
Fig. 1 shows a position in space of the transmitter S and a momentary error in the position of the moving object O.

A flying object indicated at O in Fig. 1 moving away from an ultra high frequency transmitter S is to be guided along the axis M of a prescribed path in such a manner that in the event of the flying object O being deflected by some external influence the said flying object is restored to its prescribed position by control organs provided within the flying object. Let O be the actual position of the moving object at a given time and O' the prescribed position for the object at that same time. The momentary distance $r$ of the object from the prescribed position O' and the deviation $\varphi$ from an imaginary polar system of co-ordinates perpendicular to the prescribed path or axis M, which system moreover contains the momentary position of the object, determine the momentary spatial deviation of the object from its prescribed position.

The radiation pattern R of the ultra high frequency transmitter S has, for instance, clavate form, the emitted energy rotating in known manner at a constant rotational velocity and with an aperture angle α about the axis M of the prescribed path. The clavate form of the pattern is constituted by envelope surfaces of constant amplitude.

Rotation of the emitted energy is effected by constant speed drive means constituted by an electric motor M$o$ (Fig. 2) of conventional design driving the emitting antenna N, for example mechanically, at a constant angular velocity. The angular velocity, i.e. the frequency of the antenna, is determined by a low frequency signal generator Q. Fig. 3a shows the temporal pattern $U_1.f(t)$ of the voltage fed to the electric motor M$o$. A reference signal $U_2.f(t)$ is generated from the same generator Q.

This latter signal is phase-locked with the voltage $U_1.f(t)$ fed to the motor M$o$. The time-curve of the voltage $U_2.f(t)$ is depicted in Fig. 3b, the fundamental frequency $f_0$ of this voltage being assumed to be equal to that of the rotational frequency. Generally, this frequency $f_0$ may be a whole multiple of the rotational frequency, but this would involve additional, avoidable complication of the evaluating apparatus at the receiving end.

Figure 2:
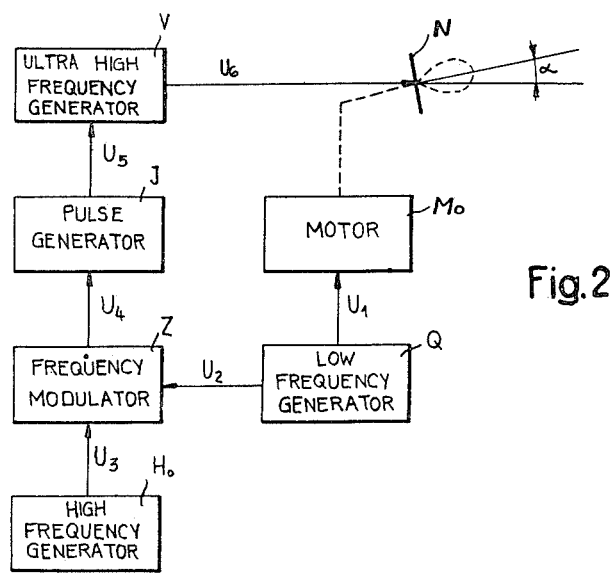
Fig. 2 shows an example of the construction of the transmitter S.
Figure 3:
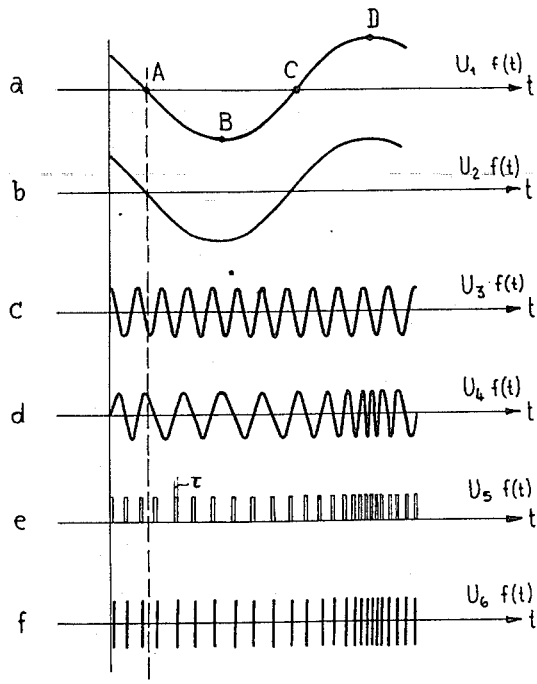
Fig. 3 shows the pattern, as a function of time, of the tensions occurring at the various points of the transmitter S.

A further voltage pattern $U_3.f(t)$ is generated by a high frequency generator HO generating an auxiliary carrier frequency (Fig. 2). The fundamental frequency $f_1$ of this pattern is substantially higher than the frequency $f_0$ of the signal generated by the generator Q. The pattern of the voltage as a function of time, $U_3.f(t)$, is plotted in Fig. 3c by way of example. By means of the low frequency signal $U_2.f(t)$ the auxiliary carrier $U_3.f(t)$ is modulated, e.g. in frequency, in a frequency or FM modulator Z by a method departing from the method of amplitude modulation, in such a way that, for example, the voltage pattern $U_4.f(t)$ plotted in Fig. 3d arises.

It will be noted that it is possible to modulate the ultra high frequency signal of the transmitter S by the voltage $U_4.f(t)$. The present invention, however, provides for the transformation of this voltage $U_4$ into pulses and it is only these latter pulses which key the transmitted power. Due to this arrangement the great advantage is obtained that the demodulation elements required at the receiver end are able to work in the linear characteristic section over a larger or even over the entire range of field strength utilized. Keying of the transmission power with magnetron transmitting tubes offers the further advantage that relatively narrow frequency bands are obtained.

It is possible to use a plurality of auxiliary carriers with like or differentiated fundamental frequencies, which are in turn modulated by a known modulation method, either directly or by the previous, itself modulated auxiliary carrier. By introducing a plurality of auxiliary carriers it is possible, needless to say, for additional control commands to be transmitted and to be evaluated at the receiving end.

According to the described embodiment, the zero passages, for example, of the auxiliary carrier $U_3.f(t)$, frequency-modulated by the low frequency signal $U_2.f(t)$, i.e., the resultant voltage $U_4.f(t)$, control a pulse generator J to form pulses of duration τ. This pulse generator consists of a two-sided amplitude limiter and a differentiator. Thus the temporal pattern $U_5.f(t)$ shown in Fig. 3e is formed, where the repetition interval T of equivalent pulses corresponds to the reciprocal value of the auxiliary carrier frequency. The time intervals between immediately following pulses correspond to the momentary amplitude values of the low frequency signal $U_2.f(t)$.

By means of this sequence of pulses $U_5.f(t)$ an ultra high frequency generator V is operated. The generator V generates, simultaneously with the occurrence of the individual pulses, ultra high frequency energy pulses whose temporal interval is a function of the zero passages of the signal $U_4.f(t)$, this latter signal in turn being functionally related to the reference signal $U_2.f(t)$ the modulated ultra high frequency signal $U_6.f(t)$ is shown in Fig. 3f.

These pulses of ultra high frequency energy are fed to the transmitting antenna N, which radiates them. Since, however, the radiation pattern of the transmitting antenna rotates in unison with the latter, points not rotating with this pattern, such as O, located in the range of action of the beam or pattern receive pulses of high-frequency energy amplitude-modulated by the fundamental frequency $f_0$, as per Fig. 6a.

If now an object is located within the radiation pattern, the amount of its deviation from the prescribed direction is determined by the measure or degree of the amplitude modulation of the transmission energy. In the axis of the prescribed direction M there is, of course, a modulation degree of 0%, and at the maximum angle of aperture α there is a maximum modulation degree of, for example, 80%.

Figure 4:
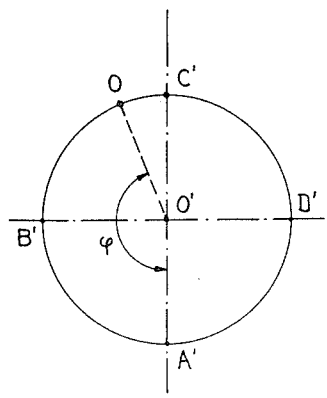
Fig. 4 shows a cross-section of the rotating radiation pattern at right angles to the axis SM of Fig. 1.

To the moments of time A, B, C and D (Fig. 3a) of the voltage $U_1.f(t)$ generating the rotary movement of the transmission beam correspond the points of intersection A', B', C' and D' of the axis of the claviform radiation pattern through the cross-sectional plane depicted in Figure 4. Accordingly, the momentary error or deviation in the position O of the object is defined by a time lag, expressed by the angle φ with respect to an assumed fixed direction (for example, A') of the transmitted beam.

Figure 5:
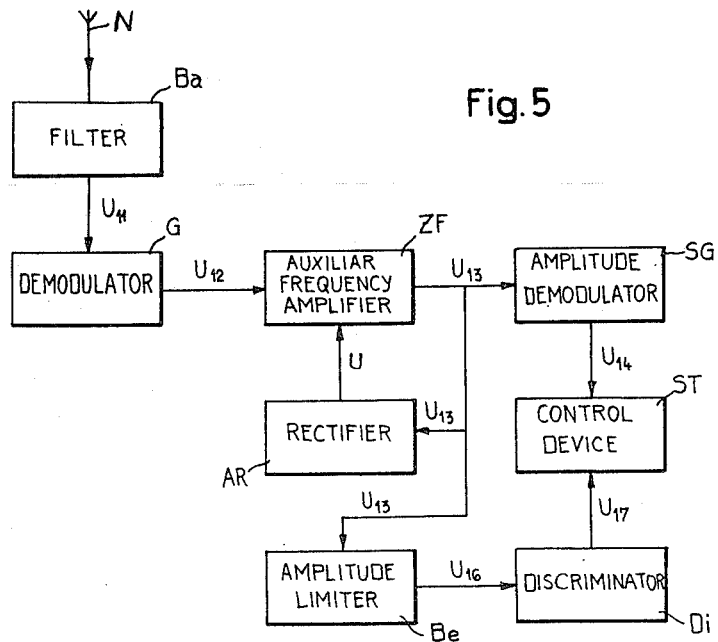
Fig. 5 shows an example of the construction of the receiver located in the moving object O.
Figure 6:
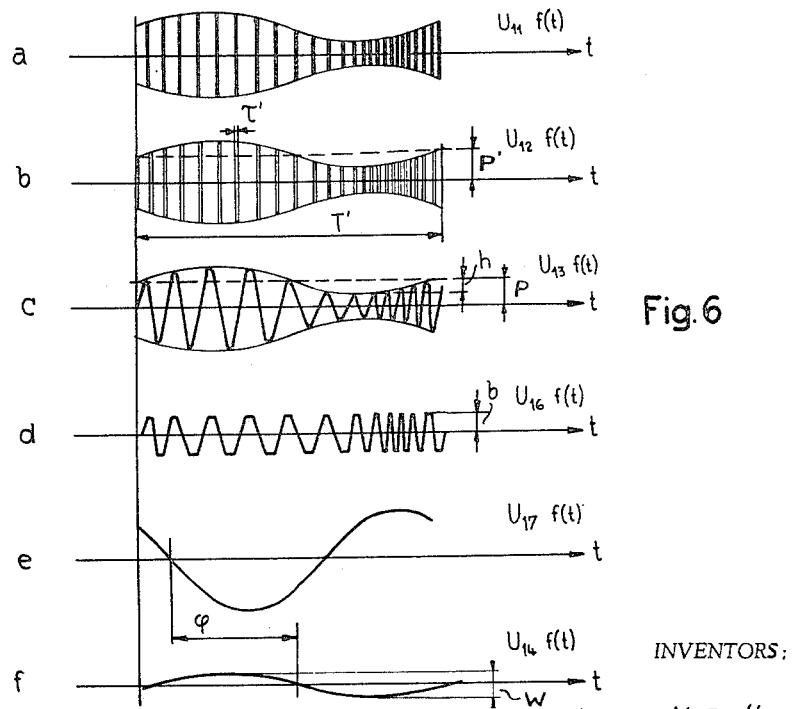
Fig. 6 shows the pattern, as a function of time, of the tensions occurring at the various points of the receiver.

The receiving equipment necessary for the purposes of the remote guidance system accommodated in the flying object, will be now discussed with reference to the diagrammatic representation in Figure 5, whilst the voltage patterns as a function of time occurring in the receiving equipment are plotted in Figure 6.

The energy received by the antenna system N, of the object to be guided is fed to recovering means including a demodulator G and a band filter system Ba serving to eliminate interfering U.H.F. signals. The demodulator G demodulates the high frequency signal varying temporally in accordance with Figure 6a, and produces the intermediate-frequency voltage pattern shown in Figure 6b. The duration of the pulses τ' and the repetition interval T' of the temporally equivalent pulses correspond to the pulse duration and the pulse repetition interval T utilized for the transmission of the ultra frequency energy as shown in Figure 3c.

By means of an auxiliary frequency amplifier ZF (or, where a plurality of auxiliary frequencies is used, by a plurality of amplifiers ZF) equally included in the recovering means, the auxiliary signal, modulated with respect to both amplitude and frequency, is amplified and its fundamental harmonic filtered out (Figure 6c). The band width of the amplifier is adapted to transmit the sidebands for the frequency sweep to their full extent.

In order to compensate for the effect of the diminishing field strength with the increase in range of the flying object, the tension $U_{13}.f(t)$ is fed on the one hand to a rectifier AR, which produces therefrom a direct current voltage U. By means of this voltage U the mean value A of the voltage $U_{13}$ is kept at a definite constant output value by influencing the degree of amplification of the auxiliary frequency amplifier ZF, in such a way that the mean value P remains constant within wide limits, independently of the mean value P' of the voltage $U_{12}$ acting on the input side of the amplifier ZF. Needless to say, the time constant of the rectifier AR regulating the amplitude must be larger by at least one order of magnitude than the modulation frequency $U_1$, so that this latter component is retained after the auxiliary frequency amplification.

Through the use of the intermediate carrier principle in accordance with the invention, regulation of the amplification in the receiver to a constant output magnitude can be employed with material advantages as compared with the aforementioned, known methods, since the time constant of the amplitude regulation can be reduced by a substantial degree. On the other hand the output voltage $U_{13}.f(t)$ of the auxiliary frequency amplifier ZF is fed to a frequency modulation detector including an amplitude limiter Be and a discriminator Di (Fig. 5). The threshold value of the limiter Be lies far below the maximum modulation degree $h$ (Fig. 6c) and thus produces a temporal voltage pattern $U_{16}.f(t)$ (Figure 6d). By means of discriminator Di the modulation signal $U_{17}.f(t)$ contained in the tension $U_{16}.f(t)$ is gained, which signal corresponds to the reference signal $U_2.f(t)$. The signal $U_{17}$ corresponds to the reference signal $U_2.f(t)$ with respect to phase. It is conceivable that the limiter Be and the rectifier member AR may have at least one stage in common.

Furthermore, from the voltage $U_{13}.f(t)$ the signal $U_{14}.f(t)$, which corresponds in frequency to the rotational velocity of the transmission beam and whose amplitude W constitutes a measure for the magnitude of a deviation of the moving object from its predetermined path or axis, is obtained by means of an amplitude demodulator or peak rectifier SG (Fig. 6f). Obviously, the amplitude W is proportional to the value $h$ of Fig. 6c.

The phase difference between the voltage $U_{14}.f(t)$ and the signal $U_{17}.f(t)$ is a measure for the momentary direction of the deviation of the object in a plane perpendicular to the prescribed path.

By means of the quantities W and $\varphi$ so obtained, the position of the object can be determined. These quantities may also serve to restore the object to its prescribed position or prescribed direction by means of a control device St which evaluates these two components.

Instead of one or several pilot frequencies it would also be conceivable for the reference signal to be transmitted in any kind of modulation by means of one or a plurality of auxiliary transmitters which, for example, have a frequency or frequencies deviating from the principal transmitter by the pilot frequency quantities. In this case also, it would be essential for the reference signal and the voltage producing the rotary movement of the main transmission beam to be phase-locked. Various changes and modifications may be made without departing from the spirit and scope of the present invention and it is intended that such changes and modifications be included in the annexed claims.

Having thus described the invention, what is claimed as new and desired to be secured by Letters Patent, is:

1. In a radio guiding system having a guide station and a guided flying object adapted to follow a predetermined axis; the combination of a transmitter in said guide station and comprising a directional transmitting antenna having a central axis and being rotatable with said central axis as a geneartrix of a cone about said predetermined axis, constant speed drive means operatively connected with said antenna to rotate the latter with said central axis on said cone and about said predetermined axis, a low frequency signal generator producing a low frequency signal and connected to said drive means to control the latter by said signal, a high frequency generator generating an auxiliary carrier frequency, a modulator connected to said high frequency generator and to said low frequency signal generator to modulate said auxiliary carrier frequency by said low frequency signal and independently of the amplitude of said auxiliary carrier frequency to cause a continuous modulated auxiliary carrier frequency, a pulse generator connected to said frequency modulator to be supplied by said modulated auxiliary carrier frequency and to generate direct voltage pulses of constant amplitude, an ultra high frequency generator connected with said pulse generator and with said antenna to generate ultra high frequency wave pulses of constant amplitude and corresponding to said direct voltage pulses supplied by said pulse generator and to feed said wave pulses to said rotating antenna, said antenna when fed with said wave pulses emitting a clavate pattern of constant amplitude envelope, said pattern rotating with said antenna; and a receiver in said flying object including a receiving antenna to receive said wave pulses from said transmitting antenna, means connected to said receiving antenna for recovering said modulated auxiliary carrier frequency from said wave pulses, a detector connected to said recovering means to continuously reproduce said low frequency signal to thereby supply a reference phase voltage, and an amplitude demodulator connected with said recovering means to detect a low frequency alternating voltage caused by the rotation of said pattern to thereby detect a deviation of said flying object from said axis, the amplitude of said alternating voltage being a function of the magnitude of said deviation, the phase angle of said alternating voltage with respect to said reference phase voltage providing an indication of the direction of said deviation, whereby due to said continuous reproduction of said reference phase voltage a continuous guiding of said flying object is obtained.

2. In a radio guiding system having a guide station and a guided flying object adapted to follow a predetermined axis; the combination of a transmitter in said guide station and comprising a directional transmitting antenna having a central axis and being rotatable with said central axis as a generatrix of a cone about said predetermined axis, constant speed drive means operatively connected with said antenna to rotate the latter with said central axis on said cone and about said predetermined axis, a low frequency signal generator producing a low frequency signal and connected to said drive means to control the latter by said signal, a high frequency generator generating an auxiliary carrier frequency, a frequency modulator connected to said high frequency generator and to said low frequency signal generator to modulate said auxiliary carrier frequency by said low frequency signal to cause a continuous modulated auxiliary carrier frequency, a pulse generator connected to said frequency modulator to be supplied by said modulated auxiliary carrier frequency and to generate direct voltage pulses of constant amplitude and duration, whereby the time intervals between immediately following pulses correspond to the momentary amplitude values of said low frequency signal, an ultra high frequency generator connected with said pulse generator and with said antenna to generate ultra high frequency wave pulses of constant amplitude and corresponding to said direct voltage pulses supplied by said pulse generator and to feed said wave pulses to said rotating antenna, said antenna when fed with said wave pulses emitting a clavate pattern of constant amplitude envelope, said pattern rotating with said antenna; and a receiver in said flying object including a receiving antenna to receive said wave pulses from said transmitting antenna, means connected to said receiving antenna for recovering said modulated auxiliary carrier frequency from said wave pulses, a frequency modulation detector connected to said recovering means to continuously reproduce said low frequency signal to thereby supply a reference phase voltage, and an amplitude demodulator connected with said recovering means to detect a low frequency alternating voltage caused by the rotation of said pattern to thereby detect a deviation of said flying object from said axis, the amplitude of said alternating voltage being a function of the magnitude of said deviation, the phase angle of said alternating voltage with respect to said reference phase voltage providing an indication of the direction of said deviation, whereby due to said continuous reproduction of said reference phase voltage a continuous guiding of said flying object is obtained.

3. In a radio guiding system for a guided flying object adapted to follow a predetermined axis, a guide station having a transmitter comprising a directional transmitting antenna having a central axis and being rotatable with said central axis as a generatrix of a cone about said predetermined axis, constant speed drive means operatively connected with said antenna to rotate the latter with said central axis on said cone and about said predetermined axis, a low frequency signal generator producing a low frequency signal and connected to said drive means to control the latter by said signal, a high frequency generator generating an auxiliary carrier frequency, a modulator connected to said high frequency generator and to said low frequency signal generator to modulate said auxiliary carrier frequency by said low frequency signal and independently of the amplitude of said auxiliary carrier frequency to cause a continuous modulated auxiliary carrier frequency, a pulse generator connected to said frequency modulator to be supplied by said modulated auxiliary carrier frequency and to generate direct voltage pulses of constant amplitude, an ultra high frequency generator connected with said pulse generator and with said antenna to generate ultra high frequency wave pulses of constant amplitude and corresponding to said direct voltage pulses supplied by said pulse generator and to feed said wave pulses to said rotating antenna, said antenna when fed with said wave pulses emitting a clavate pattern of constant amplitude envelope, said pattern rotating with said antenna, whereby due to the continuous transmission of said low frequency signal a continuous reference value is furnished to said flying object.

4. In a radio guiding system for a guided flying object adapted to follow a predetermined axis, a guide station having a transmitter comprising a directional transmitting antenna having a central axis and being rotatable with said central axis as a generatrix of a cone about said predetermined axis, constant speed drive means operatively connected with said antenna to rotate the latter with said central axis on said cone and about said predetermined axis, a low frequency signal generator producing a low frequency signal and connected to said drive means to control the latter by said signal, a high frequency generator generating an auxiliary carrier frequency, a frequency modulator connected to said high frequency generator and to said low frequency signal generator to modulate said auxiliary carrier frequency by said low frequency signal to cause a continuous modulated auxiliary carrier frequency, a pulse generator connected to said frequency modulator to be supplied by said modulated auxiliary carrier frequency and to generate direct voltage pulses of constant amplitude and duration, whereby the time intervals between immediately following pulses correspond to the momentary amplitude values of said low frequency signal, an ultra high frequency generator connected with said pulse generator and with said antenna to generate ultra high frequency wave pulses of constant amplitude and corresponding to said direct voltage pulses supplied by said pulse generator and to feed said wave pulses to said rotating antenna, said antenna when fed with said wave pulses emitting a clavate pattern of constant amplitude envelope, said pattern rotating with said antenna, whereby due to the continuous transmission of said low frequency signal a continuous reference value is furnished to said flying object.

References Cited in the file of this patent
UNITED STATES PATENTS

| | | |
|---|---|---|
| 2,165,800 | Koch | July 11, 1939 |
| 2,377,902 | Relson | June 12, 1945 |
| 2,404,942 | Bedford | July 30, 1946 |
| 2,448,016 | Busignies | Aug. 31, 1948 |
| 2,449,982 | De Rosa | Sept. 28, 1948 |
| 2,450,005 | Labin et al. | Sept. 28, 1948 |
| 2,539,905 | Herbst | Jan. 30, 1951 |
| 2,554,188 | Guanella | May 22, 1951 |
| 2,565,506 | Litchford | Aug. 28, 1951 |
| 2,578,241 | Guanella | Dec. 11, 1951 |